US006200068B1

(12) United States Patent
Bath et al.

(10) Patent No.: US 6,200,068 B1
(45) Date of Patent: Mar. 13, 2001

(54) HOT TAP FLUID BLASTER APPARATUS AND METHOD OF USING SAME

(75) Inventors: William R. Bath, Cypress; Fredric L. Hettinger, Houston; Timothy Clark, Katy; Roberto Noce, Houston, all of TX (US)

(73) Assignee: Sonsub, Inc., Houston, TX (US)

( * ) Notice: Subject to any disclaimer, the term of this patent is extended or adjusted under 35 U.S.C. 154(b) by 0 days.

(21) Appl. No.: 09/019,685

(22) Filed: Feb. 6, 1998

(51) Int. Cl.[7] ........................................... F16L 1/12
(52) U.S. Cl. ............................. 405/154; 137/15; 137/317; 15/104.061; 134/22.12; 134/167 R; 134/168 R; 134/168 C; 134/167 C
(58) Field of Search ................................. 405/169, 170, 405/171, 154; 134/22.12, 168 C, 169 C, 166 R, 167 R, 168 R, 167 C, 169 R, 172, 173, 198, 170, 166 C; 137/15, 317; 15/3.5, 104.03, 104.05, 104.061, 104.095, 104.09

(56) References Cited

U.S. PATENT DOCUMENTS

| | | | |
|---|---|---|---|
| 3,593,728 | * 7/1971 | Sauer | 134/168 R |
| 3,641,777 | * 2/1972 | Banjavich et al. | 405/170 X |
| 4,203,687 | * 5/1980 | Sumner | 405/170 |
| 4,411,459 | * 10/1983 | Ver Nooy | 137/15 X |
| 4,485,668 | * 12/1984 | Hudson et al. | 73/40.5 A |
| 4,649,948 | * 3/1987 | Hudson | 73/40.5 A |
| 5,109,562 | * 5/1992 | Albrecht | 134/166 R |
| 5,437,517 | * 8/1995 | Carrioli et al. | 405/169 |
| 5,593,249 | * 1/1997 | Cox et al. | 405/169 X |
| 5,674,323 | * 10/1997 | Garcia | 134/22.12 X |
| 5,795,402 | * 8/1998 | Hargett, Sr. et al. | 134/22.12 X |
| 5,814,162 | * 9/1998 | Barrett et al. | 134/22.12 |
| 5,988,188 | * 11/1999 | Born | 134/22.12 X |

* cited by examiner

*Primary Examiner*—Eileen D. Lillis
*Assistant Examiner*—Sunil Singh
(74) *Attorney, Agent, or Firm*—Akin, Gump, Strauss, Hauer & Feld, L.L.P.

(57) ABSTRACT

A apparatus and method of using the apparatus for removing a blockage in a subsea pipeline without retrieval of the pipeline to the surface. The apparatus components include a hot tap saddle, a drill assembly, a fluid blaster assembly and a support frame. The hot tap saddle component has a first portion and a second portion, with the first and second portions being configured to clampingly engage in a sealing relationship to the subsea pipeline. The first portion of the saddle includes a first and second opening with the first opening extending generally upwardly and configured for connecting to a drill assembly and the second opening being positioned generally at an angle to the first opening and configured for connecting to a fluid blaster assembly. The fluid blaster assembly including a nozzle, a hose and a high pressure pump with the fluid blaster assembly being contained within a pressure vessel. The fluid blaster assembly is configured for mounting to the second opening of the hot tap saddle component. The support frame assembly is configured for gripping and supporting the subsea pipeline on the sea floor while the fluid blaster assembly operates to remove a blockage in the subsea pipeline with the pipeline being under pressure and without severing the pipeline.

6 Claims, 10 Drawing Sheets

HOT TAP FLUID BLASTER APPARATUS AND METHOD OF USING SAME

BACKGROUND OF THE INVENTION

1. Field of the Invention

The present invention relates generally to subsea pipeline hot tapping operations, and more particularly relates to subsea pipeline fluid blasting operations conducted through a pipeline hot tap.

2. Description of the Related Art

Subsea crude oil pipelines are often plugged by localized accumulations of paraffin, hydrate and other deposits. A paraffin blockage is caused by the paraffin precipitating out of the crude oil and packing in the pipe. The paraffin is very waxy and can clog or plug the pipeline. Plugging of pipelines is a well known problem. Pipeline operators attempt to prevent this problem by requiring regular pigging of the pipeline or through the injection of solvents or chemicals in the pipeline to prevent paraffin build-up.

Nonetheless, plugging of pipelines does occur. Typically, the paraffin blockage is removed from a subsea pipeline by raising the pipeline to the surface and severing the pipeline. The pipeline can then be mechanically cleaned or the plugged section replaced. With the plug removed, the pipeline is reconnected and lowered back down to the sea floor.

It is desirable to have an apparatus and method of using the apparatus for removing any blockage in a subsea pipeline due to paraffin or hydrates or other materials that may percipitate from crude oil, and more generally to blockages of any sort that can be removed by fluid blasting or chemical decomposition. It is also desirable to be able to remove a plug in a subsea pipeline without retrieval of the pipeline to the surface. It is also desirable to be able to remove a plug in a subsea pipeline without severing the pipeline. It is also desirable to be able to remove the plug with the pipeline under pressure while protecting the environment from oil spills.

SUMMARY OF THE INVENTION

The present invention provides a method for removal of pipeline blockages in a subsea pipeline without retrieval of the pipeline to the surface and an apparatus that can be used to implement this method. The plug is removed underwater with either divers or a remotely operated vehicle. The method and apparatus of the present invention provides for the removal of the plug with the pipeline under pressure and includes provisions to prevent the escape of pipeline fluid, thus protecting the environment.

BRIEF DESCRIPTION OF THE DRAWINGS

In order to more fully understand the drawings referred to in the detailed description of the present invention, a brief description of each drawing is presented, in which.

DETAILED DESCRIPTION OF INVENTION

Figure 1:
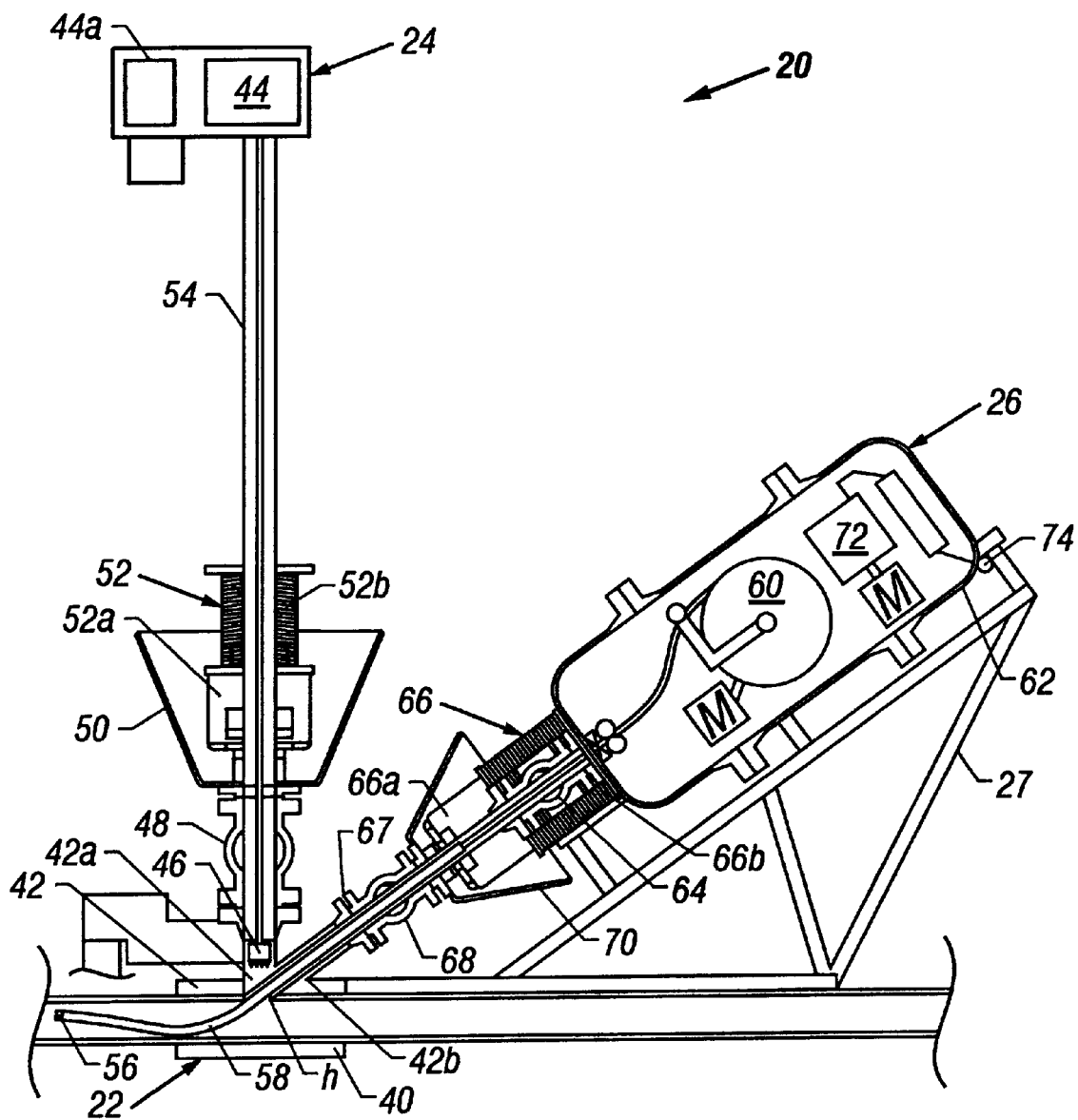
FIG. 1 is a sectional elevational view of the hot tap fluid blaster apparatus connected to a subsea pipeline.
Figure 8:
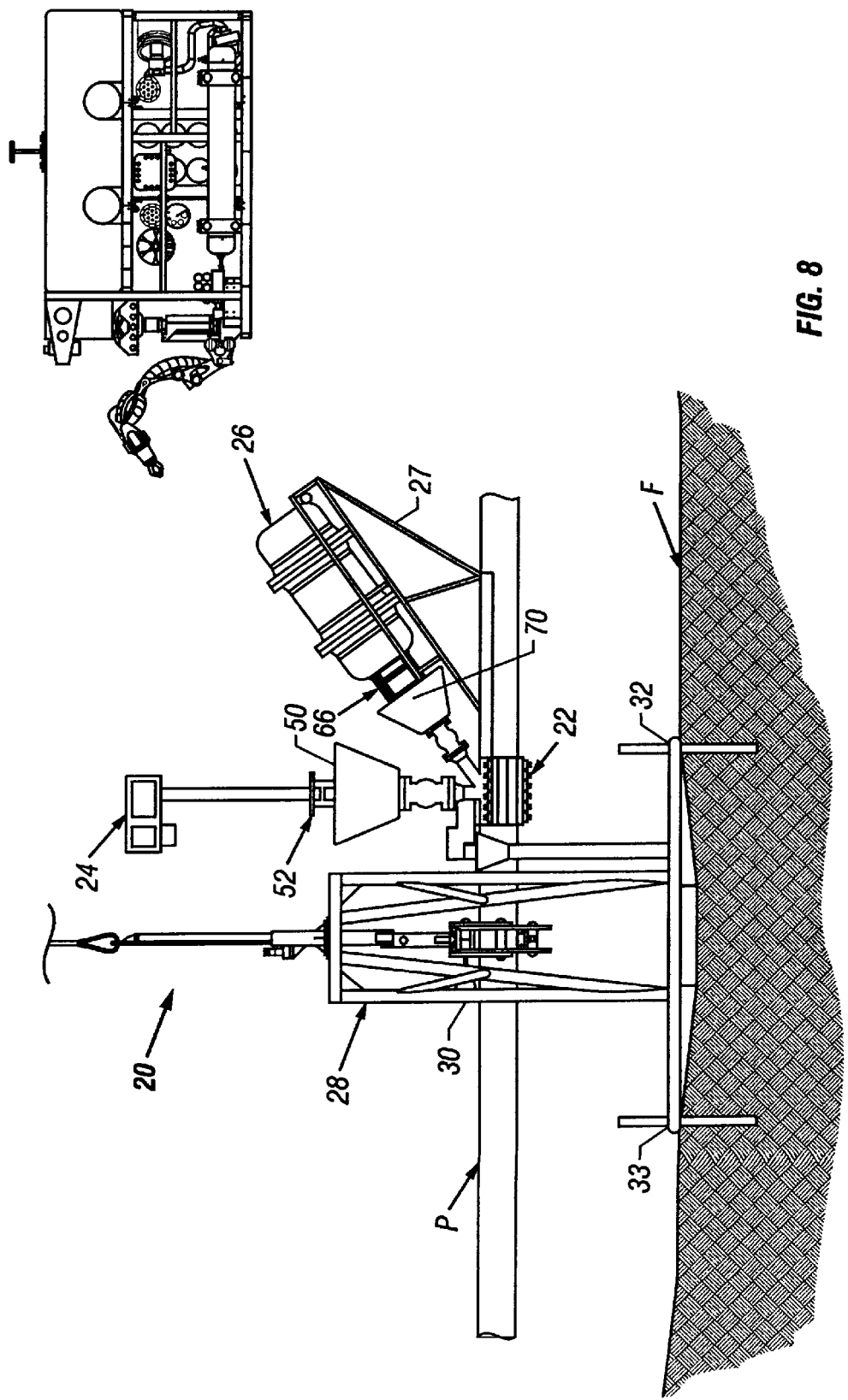
FIG. 8 is an elevational view showing the assembled hot tap fluid blaster apparatus.

The hot tap fluid blaster apparatus, generally designated as reference 20, will now be described with specific reference to the drawings. Referring to FIGS. 1 and 8, the hot tap fluid blaster apparatus 20 comprises a hot tap saddle or tee 22, a drill assembly 24, a fluid blaster assembly 26, and a support frame assembly 28 (FIG. 8).

Figure 2:
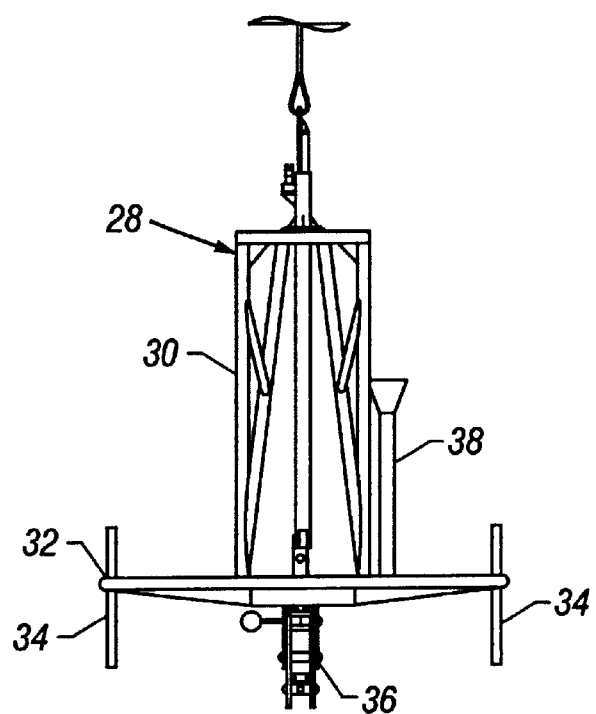
FIG. 2 is an elevational view showing the lowering of a support frame assembly to the sea floor.
Figure 2:
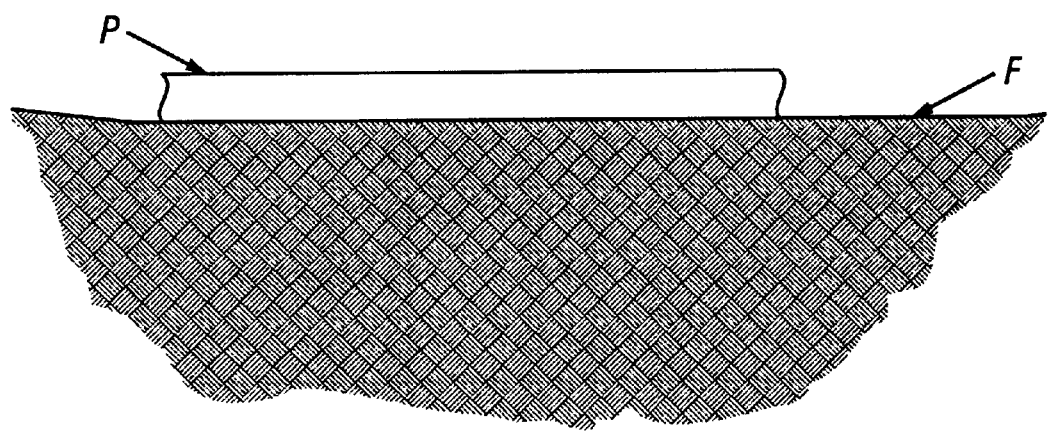

Referring to FIGS. 2 and 8, the support frame assembly 28 includes an upright framework 30 attached to a base 32 adapted to vertically support the upright framework 30 on the sea floor F. As shown in FIG. 2, the support frame assembly 28 may include a plurality of vertical legs 34 attached to the base 32 to provide support to the support frame assembly 28. The support frame assembly 28 includes a lower pipe gripper 36 for gripping onto the pipeline P. The pipe gripper 36 is preferably hydraulically controlled. The support frame assembly 28 also includes a vertical guide member 38 for reasons which will be explained below. It is to be understood that the support frame assembly 28 is similar to commercially available support frame assemblies.

Figure 3:
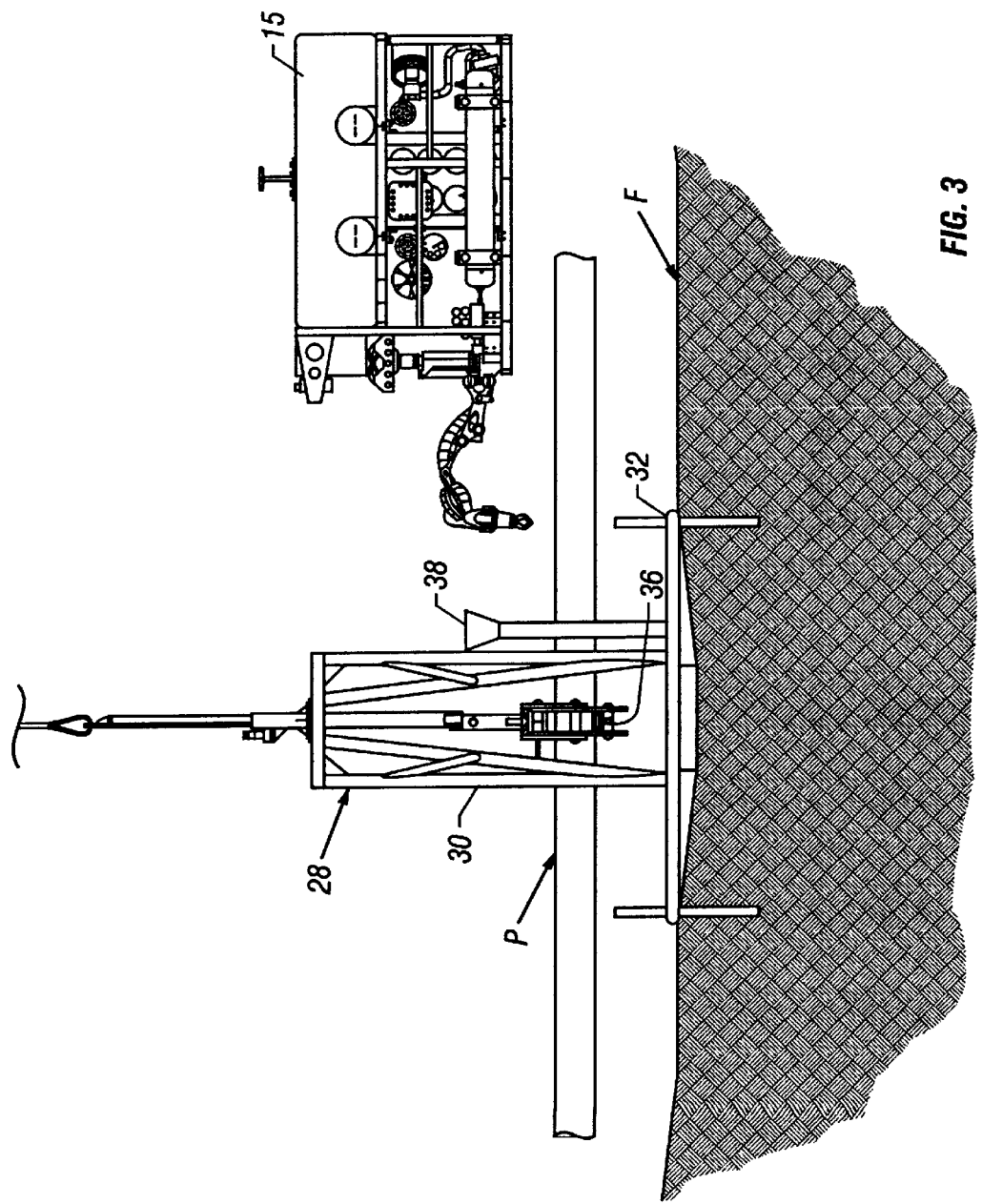
FIG. 3 is an elevational view showing the lifting of the pipeline off of the sea floor.
Figure 5:
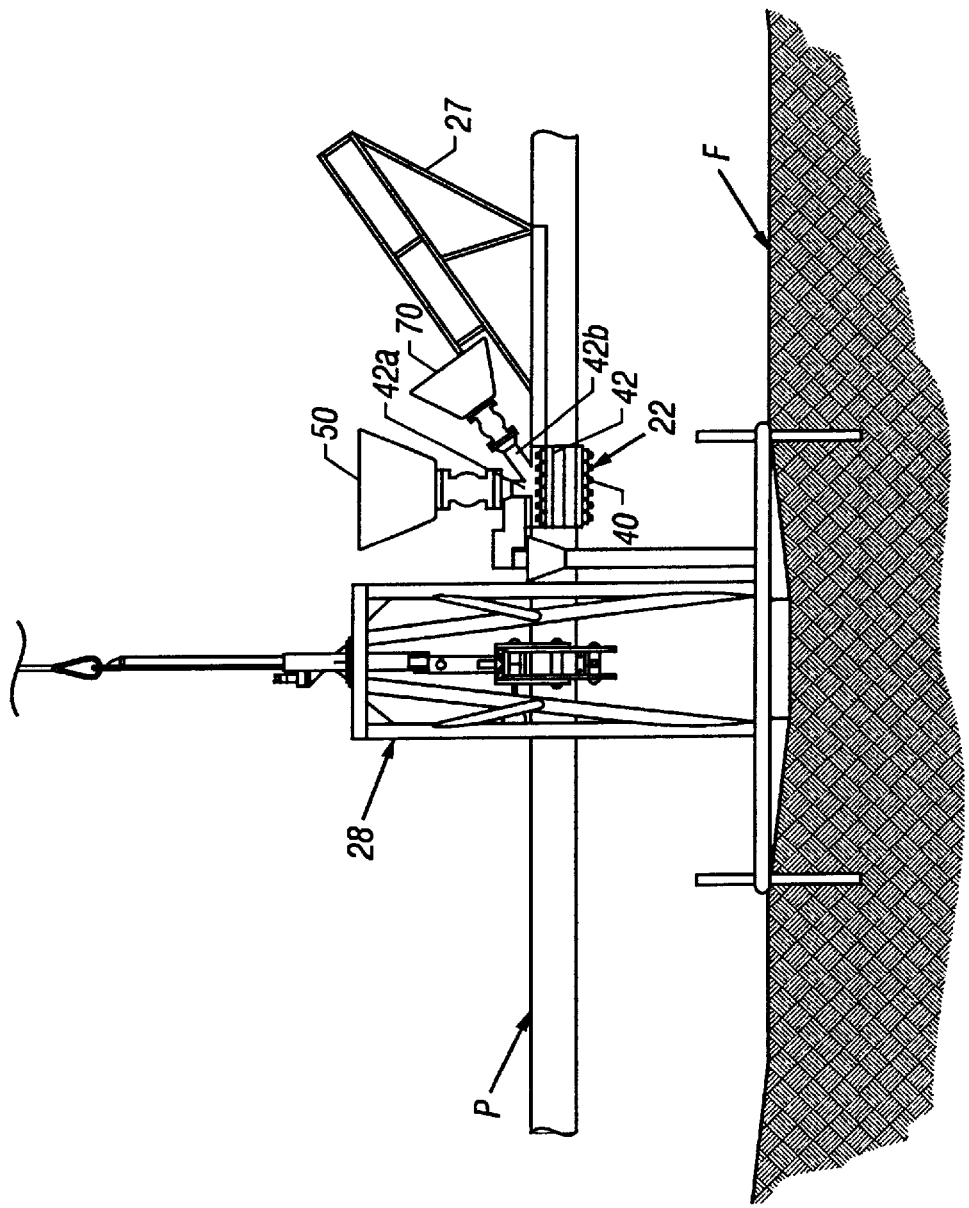
FIG. 5 is an elevational view showing the hot tap tee clamped to the pipeline.

Referring to FIGS. 1 and 5, the hot tap tee 22 is a split clamp 40 and 42 having a first port 42a extending upwardly from the first clamp 42 which is sized and shaped for connection of the drill assembly 24 and a second port 42b placed at an angle from the first port 42a which is sized and shaped for connection of the fluid blaster 26. Preferably, the hot tap tee 22 is adapted to be operated by a remotely operated vehicle (ROV) 15 (FIG. 3). The hot tap tee 22 uses a sealing system to seal the longitudinal joints of the split clamp 40 and 42. These joints are clamped by a series of studs and nuts installed by the ROV 15. The circumferential seal to the pipe P is accomplished by additional seals (not shown) that are pressed against the pipe P by an ROV-operated seal energizing system. All seals are permanently locked in place during the installation and no further action is required to maintain the seal. Preferably, an ROV pressure test port is provided to confirm the integrity of the seal before drilling operations are started.

It is to be understood that the hot tap tee 22 is similar to commercially available hot tap tees. The seals and the clamping configuration has not been changed. The one feature that has been added to the hot tap tee 22 is the second port 42b for connection of the fluid blaster 26.

Referring to FIG. 1, the drill assembly 24 includes a drill machine 44 that is a field proven device with a long history of land and diver assisted operations. The drill machine 44, preferably hydraulically driven, includes a combination pilot drill and shell cutter 46. The pilot drill and shell cutter 46 has a special feature to retain and remove a coupon cut by the shell cutter 46. Such a drill 44 is well known in the art. The drill machine 44 is sealed against pressure loss during drilling. The drill assembly 24 includes a drill conduit 54 through which the drill 44 extends.

Referring to FIG. 1, the drill assembly 24 is mounted to a hot tap tee shutoff valve 48 with an ROV collet connector 52 that allows quick installation and removal of the hot tap drill assembly 24. An ROV hot stab connects the hot tap drill assembly 24 to the ROV's hydraulic system during the drilling operation. Automatic feed of the pilot drill and shell cutter 46 is accomplished by a pressure compensated gearbox 44a connected to the drill machine 44. The hot tap drill and shell cutter 46 cuts a hole h into the pipeline P as will be explained below. The hole size will depend on the pipe diameter and fluid blaster hose size. The drill assembly 24 is sealed against the pressure in the pipeline P so that when the drill 46 makes the hole h in the pipeline P, the fluid or material in the pipeline P pressurizes the interior of the drill assembly 24 through the shutoff valve 48 and the drill conduit 54.

Still referring to FIG. 1, an inverted cone 50 is preferably located above the shutoff valve 48 to provide guidance for the drill assembly 24 as it is lowered to the hot tap tee 22. A collet connector 52 is preferably used to connect the drill assembly 24 to the hot tap tee 22. The collet connector 52 includes a male portion 52a and a female portion 52b adapted to releasably mate with each other. Collet connectors are well known devices. Preferably, the male portion 52a is located within the inverted cone 50 and the female portion 52b is connected to the lower end of the drill conduit 54 of the drill assembly 24. Although not shown, it is desirable to include an isolation valve just above the female portion 52b of the collet connector 52 to prevent leakage of the pipeline fluid from the drill conduit 54 and the drill assembly 24 after drilling the hole h.

The fluid blaster 26 is a field proven concept that has been used for many years by plumbers and sewer pipe cleaning professionals. A specialized rotary nozzle 56 on a 400 ft. long hose 58 is introduced into the pipeline to break up and clear the paraffin blockage. The hose 58 is advanced, by a motor driven hose reel 60, into the pipeline through the hole previously drilled by the hot tap drill. Once inside the pipeline rearward facing jets (not shown) in the nozzle 56 pull the hose 58 into the pipe as the nozzle 56 advances through the pipe. When the nozzle 56 reaches the blockage, forward travel automatically stops until sufficient material has been removed to allow the nozzle 56 to advance. Tunneling through the blockage with a small bore hole is prevented because the cutting jets are nearly perpendicular to the pipe centerline. No forward jets are used. The nozzle 56 has a rotating head feature (not shown) that removes the blocking material radially out to the walls of the pipe as the nozzle 56 advances.

As shown in FIG. 1, the fluid blaster 26 is contained inside a pressure vessel 62 that prevents any leakage of pipeline fluid out of the system. The vessel 62 is fitted with an isolation valve 64 and an ROV operated collet connector 66. The hot tap tee 22 includes a connector 67 and a shutoff valve 68 for quick and simple connection the fluid blaster 26. An inverted cone 70 is preferably located above the shutoff valve 68. The collet connector 66 includes a male portion 66a and a female portion 66b adapted to releasably mate with each other. Preferably, the male portion 66a is located within the inverted cone 70 and the female portion 66b is connected to the lower end of the vessel 62. A high pressure pump 72, powered by the ROV, provides pressure to the fluid blaster nozzle 56. Filtered seawater or other fluid from outside the fluid blaster vessel is used as the primary blockage clearing fluid. An ROV operated connector 74 on the outside of the vessel 62 allows the use of externally supplied fluids, such as diesel fuel or solvents, as the clearing fluid. The hydraulically powered hose reel 60 with a level wind capability provides retrieval of the fluid blaster hose 58 and nozzle 56. ROV readable pressure gauges and a hose length meter (not shown) provides continuous monitoring of the water blasting operation. The ROV supplies hydraulic fluid to the hose reel 60 and pump 72 via hot stab connections.

The operation of the inventive apparatus to remove a plug in a subsea pipeline is shown in FIGS. 2–10 and described as follows. The insertion point or location of the hot tap tee 22 is identified on the pipeline, and the support frame 28 is then lowered to the seabed by the support vessel (FIG. 2). The ROV guides and positions the support frame 28 as it is lowered so that the pipe gripper attaches itself to the pipeline P using an automatic latching system. Two additional lifting frames (not shown) may be landed on the pipeline P on either side of the support frame 28 to provide additional support for the pipeline P so that bending stresses at the hot tap location are reduced or eliminated (FIG. 3).

Figure 4:
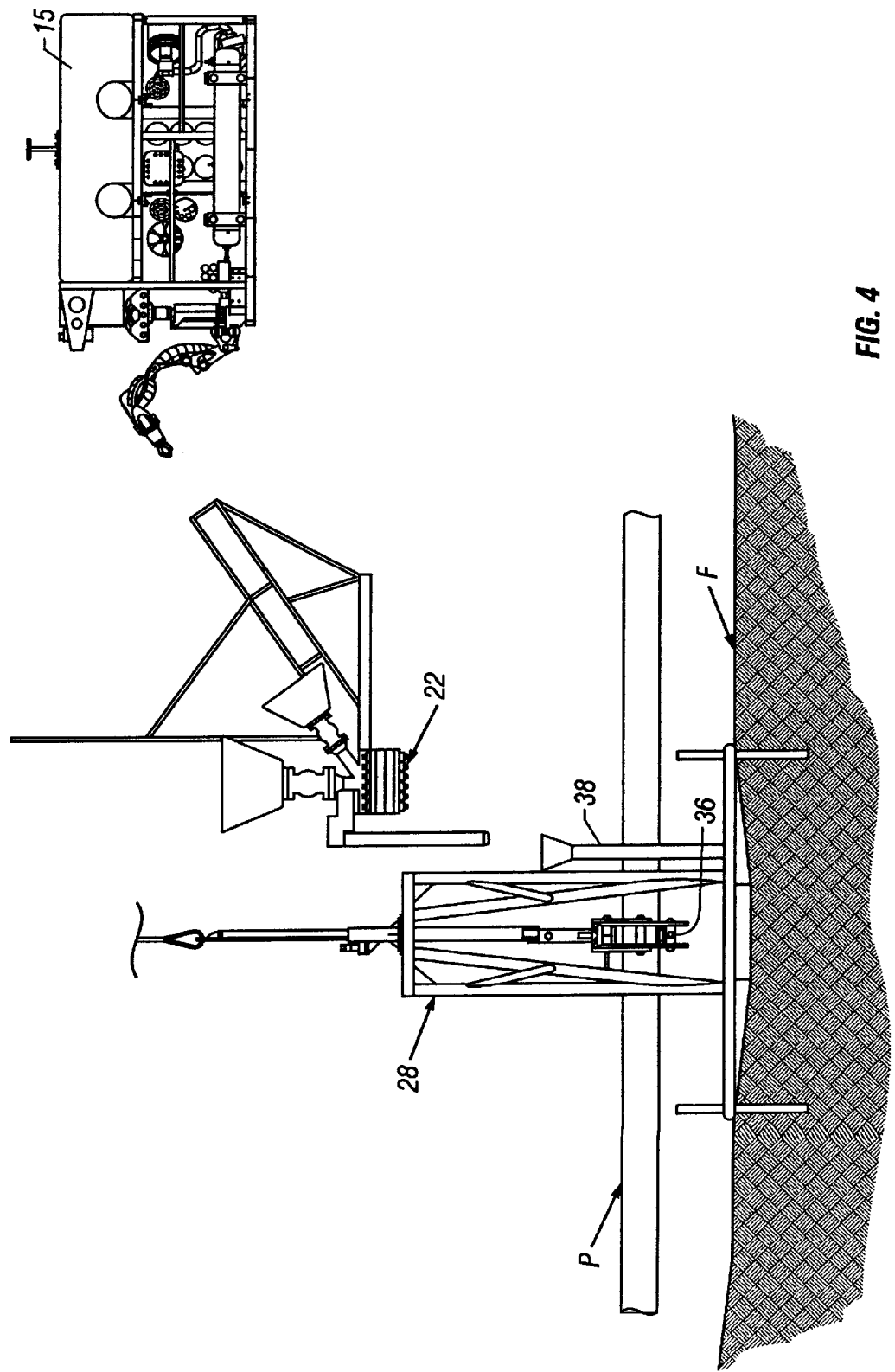
FIG. 4 is an elevational view showing the landing of a hot tap tee.

The ROV provides power to the support frame 28 and lift frames, if used, to lift the pipeline P off the sea floor (FIG. 4). Each frame is raised in increments sufficiently small to prevent excessive stress on the pipeline P. When the pipeline P has been raised to sufficient height above the sea floor, the ROV makes a visual inspection of the pipe surface that will be covered by the hot tap tee 22. The ROV uses water jet cleaning or wire brushes to clean the pipe P as needed. The ROV then uses a manipulator held gauging tool to confirm that the pipe P is sufficiently round and straight to provide a leak tight seal.

As shown in FIG. 4, the hot tap tee 22 is guided on to the pipeline P by the dedicated support frame 28. The support frame 28 is placed on the pipeline P before the pipeline P is lifted from the seabed. This method is used to avoid inadvertent bending loads being applied to the pipeline P during deployment. The support frame 28 may be deployed with the hot tap tee 22 attached. Depending on sea conditions and vessel capabilities during the installation, the hot tap tee 22 may be deployed separately and mated to the support frame 28 on the sea floor. Stabbing guides are provided for separate deployment. The support frame 28 and integrated hot stab tee 22 provides rigid support of the pipeline P during installation and operation of the HTFP.

If the hot tap tee 22 was not deployed with the support frame 28, it can now be lowered by the support vessel and docked with the support frame 28. With the hot tap tee 22 in place (FIG. 5), the ROV operates the support frame 28 to raise the pipe P into the clamping section of the hot tap tee 22. When the pipe P contacts the hot tap tee 22, the ROV operates a hydraulic valve to close the tee clamping section around the pipe P. The ROV then installs and tightens the longitudinal seal bolts. When this is complete, the ROV energizes the circumferential seals. The ROV then connects to the test port to pressurize the internal volume of the hot tap tee 22 to confirm a leak tight connection of the hot tap tee 22 to the pipe P.

Figure 6:
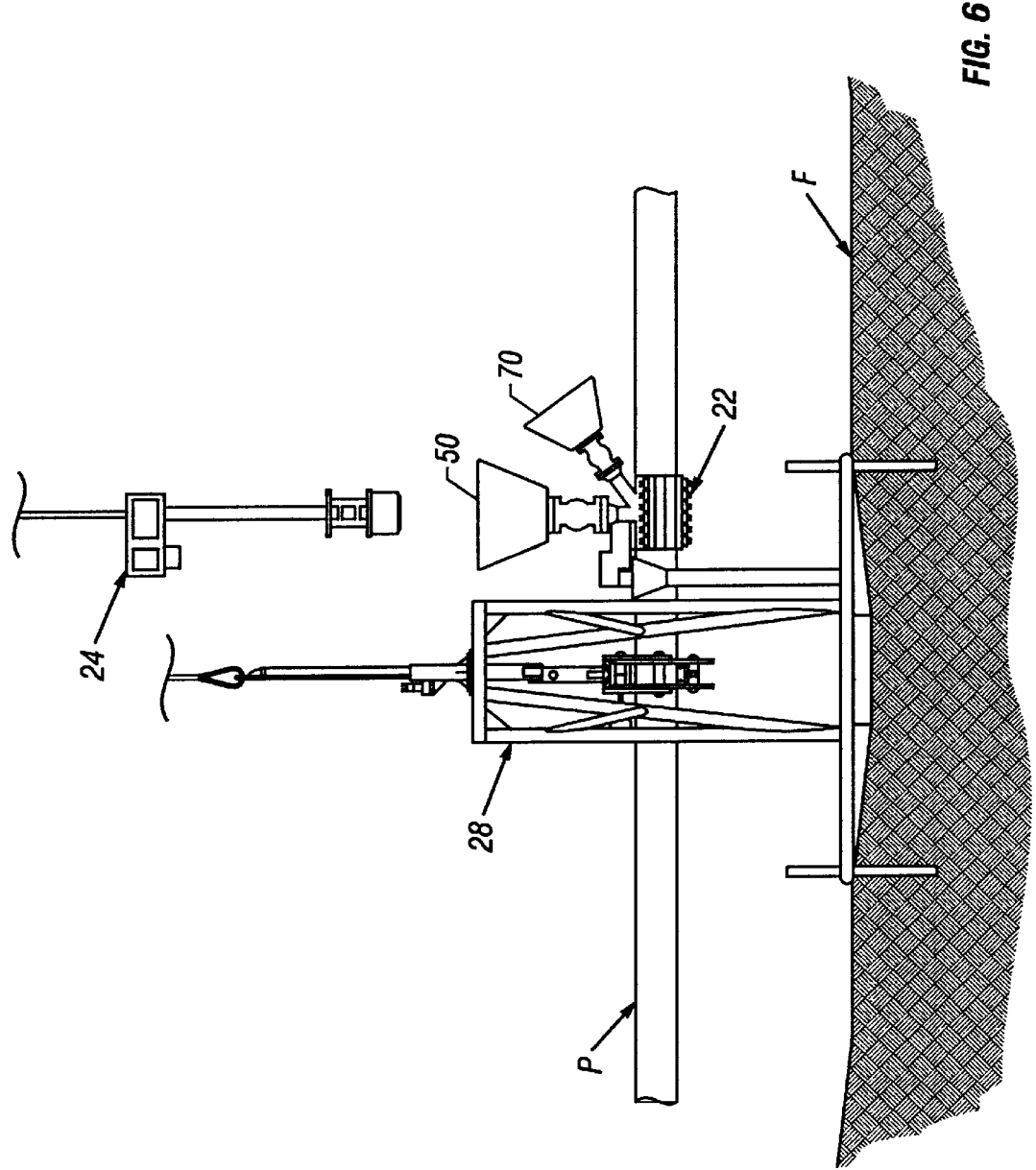
FIG. 6 is an elevational view showing the landing of the drill assembly.

With the hot tap tee 22 and support frame 28 firmly secured to the pipeline P, the drilling machine 24 is lowered by the support vessel (FIG. 6). The ROV guides the drilling machine 24 to the stabbing guide on the hot tap tee 22 and sets the collet connector 52. The ROV opens the shutoff valve 48 on the hot tap tee drilling port 42a. The ROV connects a hot stab hydraulic connection to the drilling machine 24 and drills a 3" diameter hole in the pipeline P.

After the coupon has been cut, the drill motor is reversed to retract the drill and the coupon into the drilling machine body. The ROV then closes the shutoff valve 48 on the hot tap tee drilling port 42a. The drilling machine 24 may be removed at this point.

Figure 7:
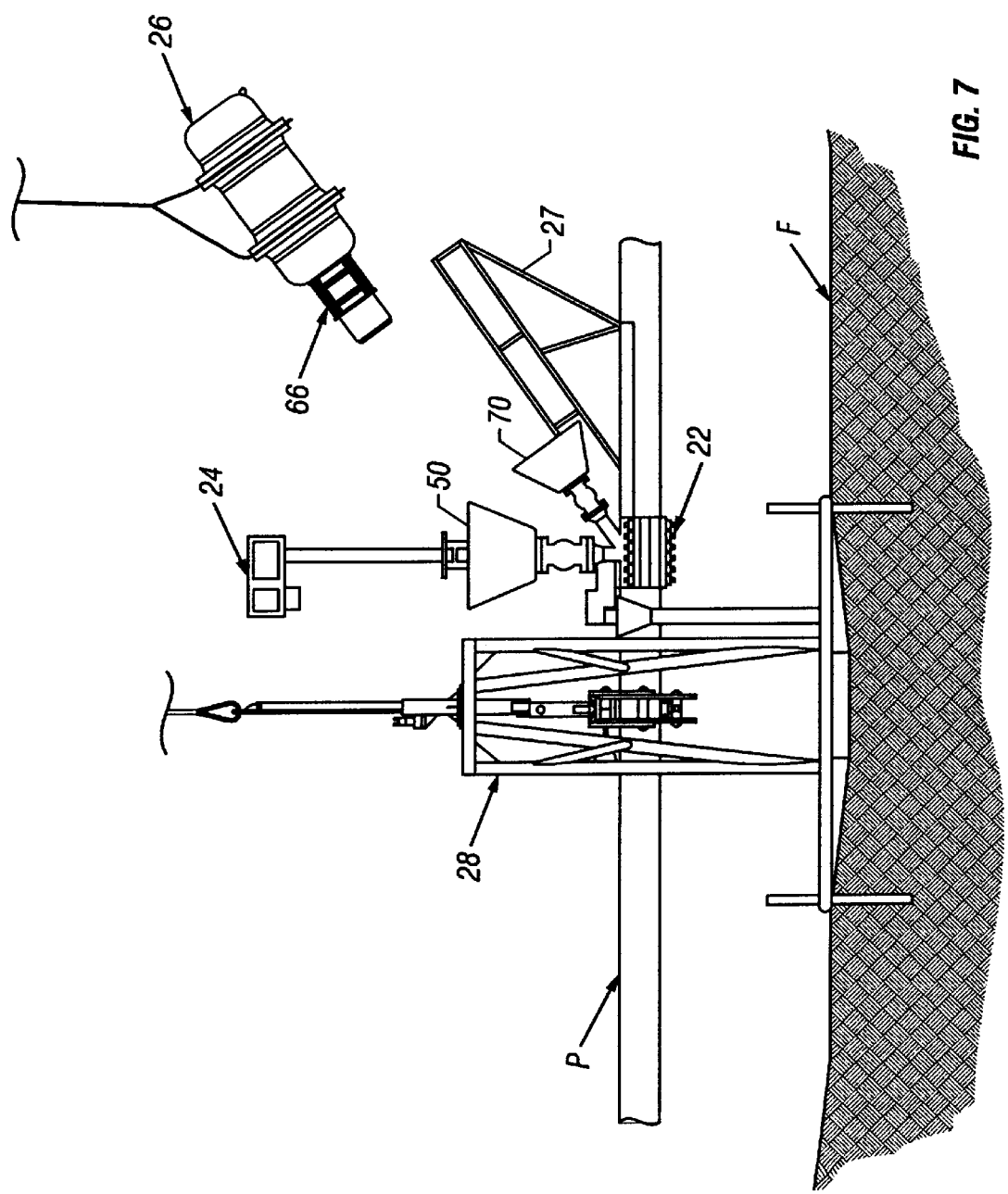
FIG. 7 is an elevational view showing the landing of the fluid blaster assembly.

The fluid blaster 26 and guide frame 27 are then lowered by the support vessel (FIG. 7). The guide frame 27 is secured to the hot tap tee 22 and pipeline P by the ROV. The fluid blaster 26 is then landed on the hot tap tee 22 and the ROV sets the collet connector 66. The ROV can then open the shutoff valve 68 on the hot tap tee 22 and the isolation valve 64 on the fluid blaster 26. The ROV docks with the fluid blaster control panel and connects a hot stab hydraulic supply (FIG. 8). Using the hose length meter as a guide, the ROV operates the hose reel 60 to advance the hose 58 through the 3" hole cut by the drilling machine 24 and into the pipeline P. A metal guide protects the hose 58 from chafing against the cut edge of the hole. When the hose 58 is 2 to 3 ft. into the pipeline P, the ROV places the hose reel 60 in free spool mode and turns on the high pressure pump 74. The fluid blaster nozzle 56 then pulls the hose 58 through the pipe P removing the paraffin blockage as it advances. The ROV monitors the operation with the hose length meter and pressure gauges. Once the blockage has been cleared or maximum hose length has been extended, the ROV turns off the high pressure pump 74 and powers the hose reel 66 to retract the hose 58. When the hose length meter indicates that the hose 58 is fully retracted, the ROV closes the hot tap tee shutoff valve 68. The pipeline P can now be pigged to confirm that the blockage has been cleared.

Figure 9:
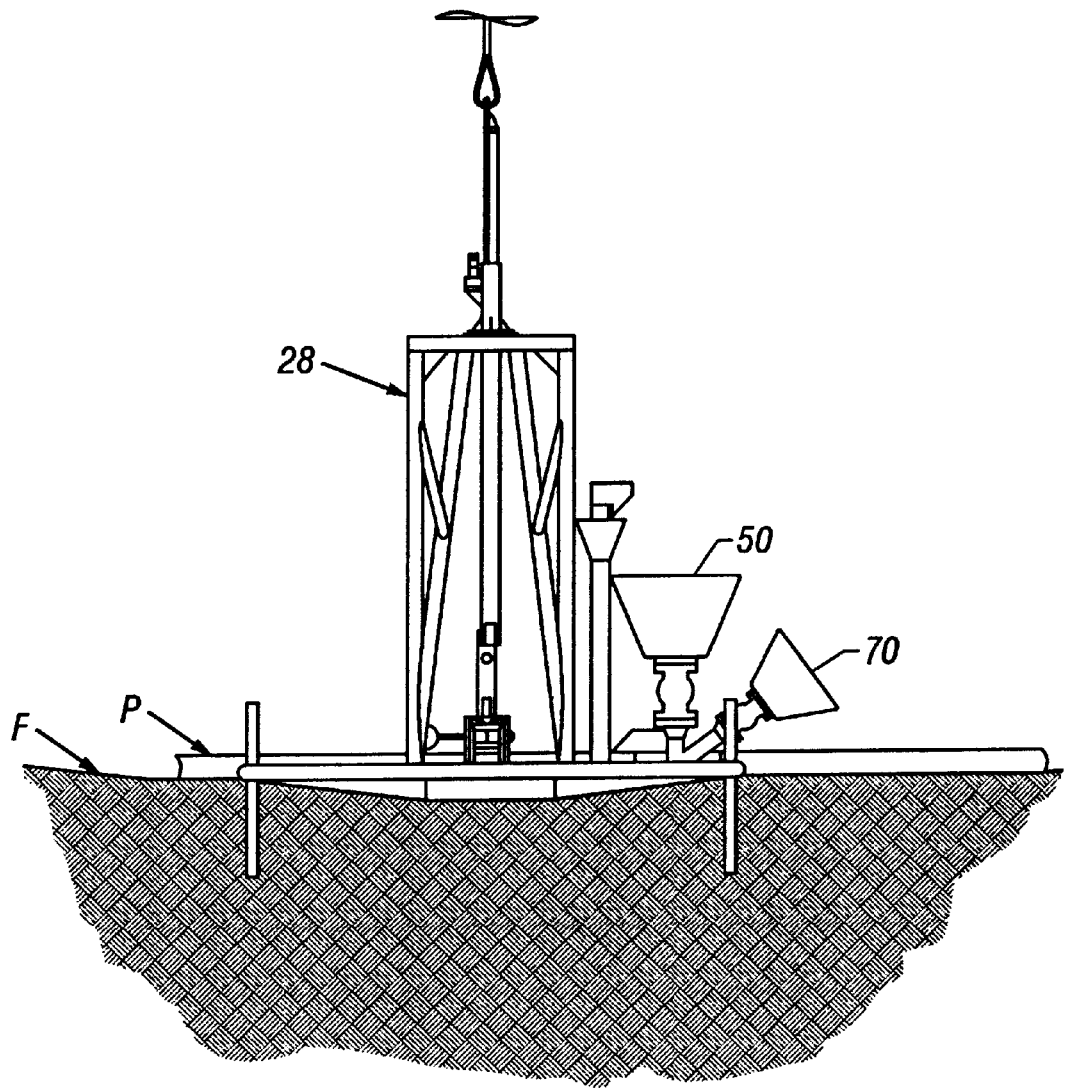
FIG. 9 is an elevational view showing the drill assembly and the fluid blaster assembly recovered and the pipeline set on the sea floor.
Figure 10:
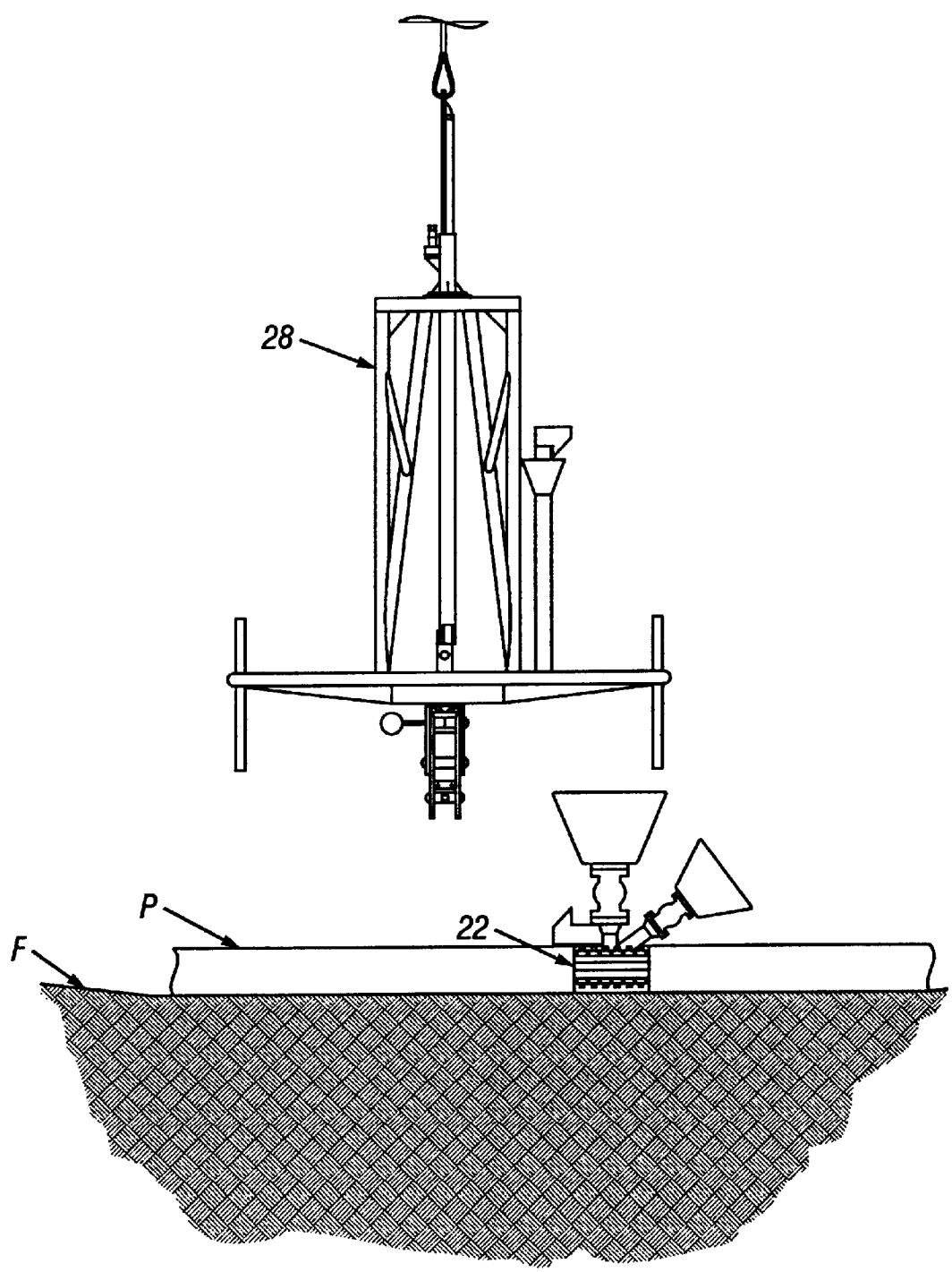
FIG. 10 is an elevational view showing the recovery of the support frame assembly.

On completion of operations, the ROV closes the fluid blaster isolation valve 64 and releases the collet connectors 66 and 52 respectively on the fluid blaster 26 and hot tap drill 24 (FIG. 9). The drilling machine 24 and fluid blaster 26 are recovered to the surface by the support vessel (FIG. 10). Special collet connectors with blind flanges are lowered by the support vessel and installed by the ROV on the hot tap tee shutoff valves. After a visual inspection, the ROV can then pull the release pins to disconnect the hot tap tee 22 from the support frame 28. The ROV then operates the lifting mechanism on the support frames 28 to lower the pipeline P to the seabed. Once the pipeline P is resting securely on the seabed, the ROV can pull two release pins on each pipe gripper 36 to release the support and lifting frames 28 from the pipeline. The support and lifting frames can now be recovered to the support vessel. The pipeline P is now ready for normal service.

It is to be understood that all of the components of the hot tap fluid blaster apparatus 20 may be operated by divers or a remotely operated vehicle (ROV) 15 and suitable for use at any water depths. The modular components of the hot tap fluid blaster apparatus 20 can be deployed from a diver support vessel. Individual components of the hot tap fluid blaster apparatus 20 are retrievable for contingency intervention. The hot tap fluid blaster apparatus 20 incorporates sealed housings to contain pipeline fluids during the tapping and blockage clearing operations. Shutoff valves and isolation valves provide minimal fluid loss during disconnection. At the conclusion of the blockage clearing operations, the tools are recovered to the surface leaving substantially only the clamp-on hot tap tee 22 on the pipeline P. The hot tap tee 22 is fitted with two ROV operated shutoff valves and each valve has a blind flange installed on the outlet. The pipeline P is returned to normal operation with the hot tap tee 22 sealing the pipeline P at the intervention point. Normal pigging operations can be used with the hot tap tee 22 in place. Life expectancy for the hot tap tee seals can reasonably be expected to exceed 20 years.

The foregoing disclosure and description of the invention are illustrative and explanatory thereof, and various changes in the details of the illustrated apparatus and construction and method of operation may be made without departing from the spirit of the invention.

What is claimed is:

1. An apparatus for removing a blockage in a subsea pipeline without retrieval of the pipeline to the surface, the apparatus components including a hot tap saddle, a drill assembly, a fluid blaster assembly and a support frame assembly, the components comprising:

the hot tap saddle component having a first portion and a second portion, the first and second portions being configured to clampingly engage in a sealing relationship to the subsea pipeline;

the first portion including a first and second opening, the first opening extending generally upwardly and configured for connecting to the drill assembly and the second opening being positioned generally at an angle to the first opening and configured for connecting to the fluid blaster assembly;

the drill assembly including a drill machine and a drill conduit for drilling an opening in the subsea pipeline, the drill assembly being configured for mounting engagement with the first opening of the hot tap saddle component:

the fluid blaster assembly including a nozzle, a hose and a high pressure pump, the fluid blaster assembly being contained within a pressure vessel, the fluid blaster assembly being configured for mounting engagement with the second opening of the hot tap saddle component; and the support frame assembly configured for gripping and supporting the subsea pipeline at or near the sea floor while the fluid blaster assembly removes the blockage in the subsea pipeline while maintaining pressure within the pipeline and without severing the pipeline.

2. The apparatus of claim 1, wherein the apparatus allows for the removal of the blockage from the subsea pipeline at or near the sea floor through the use of divers or a remotely operated vehicle.

3. The apparatus of claim 1, wherein the fluid blaster assembly is configured so as to allow the nozzle and hose to be placed into the subsea pipeline from the second opening of the hot tap saddle component, whereby the pressurized fluid from the fluid blaster removes the blockage.

4. The apparatus of claim 1, wherein the fluid blaster assembly includes an isolation valve and a collet connector that allows for quick installation and removal of the fluid blaster assembly from the hot tap saddle component.

5. The apparatus of claim 1, wherein the drill assembly is mounted to a shutoff valve and a collet connector that allows for quick installation and removal of the drill assembly from the hot tap saddle component.

6. A method for removing a blockage in a subsea pipeline without retrieval of the pipeline to the surface with an apparatus including a hot tap saddle component, a drill assembly, a fluid blaster assembly and a support frame, the method includes the steps of:

positioning the support frame on the pipeline on the sea floor after the blockage has been located;

clamping a portion of the support frame to the pipeline and lifting the pipeline off the sea floor;

positioning the hot tap saddle component on the support frame;

lifting the pipeline into the hot tap saddle component, clamping the saddle component onto the pipeline and sealingly engaging the saddle component to the pipeline;

positioning a drill assembly onto the saddle component, drilling an opening into the pipeline, retracting the drill assembly;

positioning the fluid blaster assembly onto the hot tap saddle component and sealingly engaging the fluid blaster assembly to the saddle component;

inserting a fluid blaster nozzle into the subsea pipeline and high pressure blasting the blockage in the pipeline, and thereafter verifying pipeline flow; and removing the fluid blaster assembly from the saddle component, setting the pipeline on the sea floor and removing the support assembly from the sea floor.

\* \* \* \* \*